(12) United States Patent
Han et al.

(10) Patent No.: US 11,725,705 B2
(45) Date of Patent: Aug. 15, 2023

(54) BRAKING TORQUE SENSOR OF BRAKE

(71) Applicant: SHIJIAZHUANG WULONG BRAKE CORPORATION, Shijiazhuang (CN)

(72) Inventors: Zhengfang Han, Shijiazhuang (CN); Wulin Han, Shijiazhuang (CN); Qingsheng Li, Shijiazhuang (CN); Zengmin Hou, Shijiazhuang (CN); Yonglei Zhao, Shijiazhuang (CN); Dejun Cui, Shijiazhuang (CN); Xiongyi Hao, Shijiazhuang (CN)

(73) Assignee: SHIJIAZHUANG WULONG BRAKE CORPORATION, Shijiazhuang (CN)

( * ) Notice: Subject to any disclaimer, the term of this patent is extended or adjusted under 35 U.S.C. 154(b) by 0 days.

(21) Appl. No.: 17/780,265

(22) PCT Filed: Apr. 1, 2021

(86) PCT No.: PCT/CN2021/084807
§ 371 (c)(1),
(2) Date: May 26, 2022

(87) PCT Pub. No.: WO2021/238403
PCT Pub. Date: Dec. 2, 2021

(65) Prior Publication Data
US 2022/0412419 A1  Dec. 29, 2022

(30) Foreign Application Priority Data

May 26, 2020 (CN) .......................... 202010457345.5

(51) Int. Cl.
*F16D 66/00* (2006.01)
*G01L 5/28* (2006.01)

(52) U.S. Cl.
CPC ................ *F16D 66/00* (2013.01); *G01L 5/28* (2013.01); *F16D 2066/005* (2013.01); *F16D 2066/006* (2013.01)

(58) Field of Classification Search
CPC ............... F16D 66/00; F16D 2066/005; F16D 2066/006; G01L 5/28
See application file for complete search history.

(56) References Cited

U.S. PATENT DOCUMENTS

| 3,900,083 | A | 8/1975 | Hauth | |
|---|---|---|---|---|
| 2007/0227239 | A1* | 10/2007 | Perriard | G01L 3/1478 |
| | | | | 73/129 |

(Continued)

FOREIGN PATENT DOCUMENTS

| CN | 101846566 A | 9/2010 |
|---|---|---|
| CN | 103328287 A | 9/2013 |

(Continued)

OTHER PUBLICATIONS

International Search Report prepared by the China National Intellectual Property Administration, dated Jul. 7, 2021, 8 pages including English Translation, PCT/CN2021/084807.

*Primary Examiner* — Eric S. McCall
(74) *Attorney, Agent, or Firm* — Brooks Kushman PC; John E. Nemazi

(57) ABSTRACT

A braking torque sensor of a brake is provided, the braking torque sensor includes: a long circular shaft hole arranged on a brake arm of the brake; a connecting plate configured to detect a braking displacement which is generated by the hinge shaft of the brake element in a long circular shaft hole and varies with the magnitude of the friction force when the braking action is performed by the brake, and convert the detected displacement into a plate deformation of the connecting plate; and a tension sensor configured to convert the plate deformation generated due to the braking action on the (Continued)

connecting plate into force information, and transmit the force information outwards in a form of electrical signal or digital signal. The detection result of the braking torque sensor is consistent with the actual result, so that an abnormal condition of the brake can be detected in time.

9 Claims, 7 Drawing Sheets

(56) References Cited

U.S. PATENT DOCUMENTS

| | | | |
|---|---|---|---|
| 2009/0159375 A1* | 6/2009 | Vitali | B60T 13/74 188/250 R |
| 2014/0144728 A1* | 5/2014 | Szeto | B60T 17/22 188/1.11 R |
| 2022/0242383 A1* | 8/2022 | Camozzi | G01L 5/28 |
| 2022/0252121 A1* | 8/2022 | Camozzi | F16D 66/00 |

FOREIGN PATENT DOCUMENTS

| | | |
|---|---|---|
| CN | 108373089 A | 8/2018 |
| CN | 110195751 A | 9/2019 |
| CN | 210533594 U | 5/2020 |
| DE | 102011101419 A1 | 2/2012 |
| GB | 1034172 A | 6/1966 |

\* cited by examiner

BRAKING TORQUE SENSOR OF BRAKE

CROSS-REFERENCE TO RELATED APPLICATIONS

This application is a National Stage of International Application No. PCT/CN2021/084807 filed on Apr. 1, 2021, which claims priority to Chinese Patent Application No. 202010457345.5 filed on May 26, 2020, and entitled "braking torque sensor of brake", the contents each of which are incorporated herein by reference thereto.

TECHNICAL FIELD

The present disclosure relates to the technical field of braking torque sensor, and particularly relates to a braking torque sensor of a brake.

BACKGROUND

Currently, a braking torque detection device mounted on an electric hydraulic arm disc brake is a pressure sensor which is arranged in a spring box for receiving braking spring and configured to detect a working pressure of the brake spring, the working pressure of the brake spring is substantially equivalent to a positive pressure generated when a brake pad of the brake performs fraction braking on a brake disc, a magnitude of a friction force acted on the brake disc by the brake pad can be obtained by multiplying the value of the positive pressure by a friction coefficient between the brake pad and the brake disc, then, the braking torque of the brake can be obtained according to the friction force with the combination of the radius of the brake disc, so that detection of the braking torque of the brake is realized.

The magnitude of the braking torque of the electric hydraulic arm disc brake under normal working conditions can only be detected in this detection mode, however, once the brake arm of the brake is locked, the working pressure of the brake spring still exists without any change, in this situation, the braking torque detection device can still obtain the normal detection result of the braking torque; as a matter of fact, the brake can not provide any braking force at this time. In addition, if a friction plate on the brake pad is fallen off; at this time, since the working pressure of the brake spring still exists, the braking torque detection device can also send a normal detection result of braking torque. When the friction coefficient between the brake pad and the brake disc changes due to oil dripping, water dripping or overheating due to friction on the brake disc, the braking torque detection device can still send a norm detection result of braking torque.

The occurrence of these braking torque detection results which do not reflect the actual situation is because that the braking torque detection device speculates the braking friction force according to the positive pressure, but cannot truly detect the magnitude of the braking friction force, so that a condition that the detection result does not match with the actual result is inevitable. The fundamental purpose of the arrangement of the braking torque detection device is to timely detect an abnormal condition of the brake so as to avoid a safety accident from occurring, and reduce or even avoid heavy loss of lives and properties of people.

SUMMARY

It is an objective of the present disclosure to provide a braking torque sensor of a brake, which aims to solve a problem that the braking torque detection result does not match with the actual result under abnormal condition of the brake.

The objective of the present disclosure is realized by providing:

a braking torque sensor of a brake, including:

a long circular shaft hole arranged on a brake arm of a brake and configured to support a hinge shaft of a brake element, where when a braking action is performed by the brake, a length direction of the long circular shaft hole is consistent with a direction of a friction force acted on a position of a friction surface of the brake element, and the position of the friction surface of the brake element is located at a same height of a shaft center of the hinge shaft of the brake element, so that the hinge shaft of the brake element generates a displacement that varies with a magnitude of the friction force in a direction of the friction force when the braking action is performed by the brake;

a plate-shaped connecting plate, where one end of the connecting plate is fixed on the brake arm of the brake, and the other end of the connecting plate is sleeved on a hinge shaft of the brake element through a closed hole or an open groove, so that the shaft center of the hinge shaft of the brake element is located at a center position along a length direction of the long circular shaft hole of the brake arm when it is in a static state, and a suspension connection is formed between the brake element and the brake arm; the connecting plate is configured to: detect a braking displacement generated by the hinge shaft of the brake element in the long circular shaft hole when the braking action is performed by the brake, and generate a plate deformation corresponding to the braking displacement; and a tension sensor, fixed on an optimal position of a plate surface of the connecting plate where the plate deformation is generated, and configured to convert the plate deformation generated due to the braking action on the connecting plate into force information, and transmit the force information outwards in a form of an electrical signal or a digital signal.

In one embodiment, the connecting plate is a S-shaped plate with a rectangular profile, the tension sensor is arranged at a middle of the plate surface of the connecting plate, and a center line along a length direction of the connecting plate coincides with a center line along a length direction of the long circular shaft hole after the connecting plate is mounted on the brake arm of the brake.

In one embodiment, the connecting plate is a rectangular plate, a fixed end of the connecting plate fixed on the brake arm is a short edge end, two rectangular grooves are provided on two long edges of a plate body of the connecting plate adjacent to the fixed end, respectively, and the two rectangular grooves have a same size and are symmetrically distributed on the connecting plate; the tension sensor is arranged on a bottom groove surface of the rectangular grooves, and the center line along the length direction of the connecting plate is perpendicular to the center line along the length direction of the long circular shaft hole after the connecting plate is mounted on the brake arm of the brake.

In one embodiment, the closed hole is a round hole having a diameter slightly greater than a diameter of the hinge shaft of the brake element, or a long round hole having a radius slightly greater than a radius of the hinge shaft of the brake element; and where a length direction of the long circular hole is perpendicular to the length direction of the long circular shaft hole of the brake arm after the connecting plate is mounted on the brake arm.

In one embodiment, the open groove is a long circular hole with a semicircular groove surface, and a length direction of the open groove is perpendicular to the length direction of the long circular shaft hole of the brake arm after the connecting plate is mounted on the brake arm.

When a braking action is performed the brake by the brake element by clamping a braked element arranged on a device, friction braking is achieved through the friction force between the brake element and the braked element, the magnitude of the braking torque actually reflects the magnitude of the friction force; the magnitude of displacement generated by the brake element's hinge shaft in the long circular shaft hole of the brake arm in the direction of friction is proportional to the magnitude of the friction force. Therefore, as long as the braking displacement of the hinge shaft of the brake element can be detected and the braking displacement is converted into detection data capable of reflecting the friction force, the detection of the braking friction force can be realized, the brake braking torque can be further obtained according to the radius of a braked element (i.e., the acting force arm of the friction force) of the brake. That is, when the braking element of the brake performs braking action, a calculation of multiplying a positive pressure generated by clamping the braked element (e.g., cylindrical brake drum or disc-shaped brake disc, etc.) by the friction coefficient between the brake element and the braked element is the friction force generated when the braking action is performed by the brake, real-time detection of the brake braking torque can be achieved as long as the friction force can be detected.

According to the present disclosure, the shaft hole of the hinge shaft of the brake element on the brake arm is designed as the circular shaft hole, and the suspension connection is realized between the brake element and the brake arm through the connecting plate, due to this arrangement, when the braking action is performed by the brake, the brake element's hinge shaft can generate the braking displacement that varies with the change of the magnitude of the friction force; the displacement can be well detected by the connecting plate, the detected braking displacement can be converted into the plate deformation of the connecting plate, then, the plate deformation of the connecting plate is converted into an electric signal corresponding to the friction force by the tension sensor, and the electric signal is transmitted outwards, so that real-time detection of friction force of the brake is achieved, and the braking torque of the brake is detected in real time. This is the core of the present disclosure.

The present disclosure can also be realized by providing a braking torque sensor of a brake, including:

a long circular shaft hole arranged on a brake shoe of an external contacting brake and configured to penetrate through a hinge shaft of the brake shoe, where when a braking action is performed by the brake, a length direction of the long circular shaft hole is consistent with a direction of a friction force acted on a position of a friction surface of the brake shoe, and the position of the friction surface of the brake shoe is located at a same height of a shaft center of the hinge shaft of the brake shoe, so that the brake shoe generates a displacement that varies with a magnitude of the friction force in the direction of the friction force when the external contacting brake performs the braking action;

a plate-shaped connecting plate, where an upper end of the connecting plate is sleeved on the hinge shaft of the brake shoe through the long circular shaft hole, a lower end of the connecting plate is hinged on a side wall of the brake shoe through matching of the long circular shaft hole and the hinge shaft of the brake shoe, so that the shaft center of the hinge shaft of the brake shoe is located at a center position along a length direction of the long circular shaft hole of the brake shoe when it is in a static state; the connecting plate is configured to detect a braking displacement generated by the brake shoe in the direction of the friction force when the external contacting brake performs the braking action, and generate a plate deformation corresponding to the braking displacement; and a tension sensor, fixed on an optimal position of a plate surface of the connecting plate where the plate deformation is generated, and configured to convert the plate deformation generated due to the braking action on the connecting plate into force information, and transmit the force information outwards in a form of an electrical signal or a digital signal.

In one embodiment, the connecting plate is a S-shaped plate having a rectangular profile, the tension sensor is arranged at a middle of the plate surface of the connecting plate, and the length direction of the connecting plate coincides with the center line along the length direction of the long circular shaft hole after the connecting plate is mounted on the brake shoe of the external contacting brake.

The present disclosure can also be realized by providing a braking torque sensor of a brake, including:

a long circular shaft hole arranged on a brake pad of an arm disk brake and configured to penetrate through a hinge shaft of the brake pad, where when a braking action is performed by the brake, a length direction of the long circular shaft hole is consistent with a direction of a friction force acted on a position of a friction surface of the brake pad, and the position of the friction surface of the brake pad is located at a same height of a shaft center of the hinge shaft of the brake pad, so that the brake pad generates a displacement that varies with a magnitude of the friction force in the direction of the friction force when the arm disk brake performs the braking action;

a plate-shaped connecting plate, where a lower end of the connecting plate is sleeved on the hinge shaft of the brake pad through the long circular shaft hole, and the hinge shaft of the brake pad penetrates between two rib plates at the rear of the brake pad, an upper end of the connecting plate is provided with a through hole which is sleeved on a pin shaft between the two rib plates at the rear of the brake pad, so that the connecting plate is arranged longitudinally in a groove formed between the two rib plates at the rear of the brake pad, and a suspension connection is formed between the brake pad and the brake arm; the connecting plate is configured to detect a braking displacement generated by the brake pad in the direction of the friction force when the arm disk brake performs the braking action, and generate a plate deformation corresponding to the braking displacement; and a tension sensor, fixed on an optimal position of a plate surface of the connecting plate where the plate deformation is generated, and configured to convert the plate deformation generated due to the braking action on the connecting plate into force information, and transmit the force information outwards in a form of an electrical signal or a digital signal.

In one embodiment, the connecting plate is a S-shaped plate having a rectangular profile; the tension sensor is arranged at the middle of the plate surface of the connecting plate, and the center line along the length direction of the connecting plate coincides with the center line along the length direction of the long circular shaft hole after the connecting plate is mounted on the brake shoe of the arm disc brake.

According to the present disclosure, a false alarm phenomenon that the detection result does not match with the actual result, which is caused due to the fact that the existing braking torque sensor cannot detect the friction force of the brake under abnormal condition of the brake, has been overcome, since the friction force of the brake is detected in real time, the detection result can be changed with the change of the friction coefficient between the brake element and the braked element, and matches with the actual situation, so that an abnormal condition of the brake can be detected in time, an administrative staff and a maintenance personal can be prompted to eliminate faults and potential safety hazards of the brake timely, safety accidents caused due to reduction of braking torque of the brake are avoided, safe production is facilitated, safety use of manufacturing and conveying equipment is facilitated, and the safety of lives and properties of people is guaranteed.

In the figures: 1-brake arm; 2-hinge shaft of brake pad; 3-long circular shaft hole; 4-connecting plate; 5-closed hole; 6-open groove; 7-tension sensor; 8-brake shoe; 9-hinge shaft of brake shoe; 10-brake drum; 11-rectangular groove; 12-brake pad; 13-rib plate; 14-pin shaft.

DESCRIPTION OF THE EMBODIMENTS

Embodiment One

In this embodiment, a braking torque sensor suitable for an arm disc brake is provided. The braking torque sensor includes a long circular shaft hole arranged on a brake arm of a brake, a connecting plate connecting the brake arm and the brake pad, and a tension sensor arranged on the connecting plate.

Figure 1:
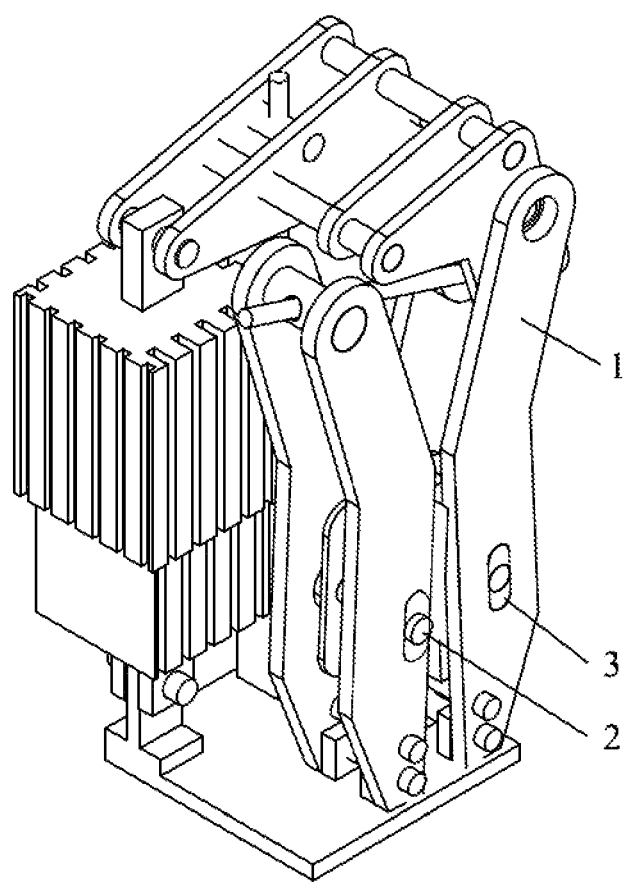
FIG. 1 illustrates a schematic structural diagram of an arm disc brake.

According to the arm disc brake shown in FIG. 1, a shaft hole arranged on the brake arm 1 and configured to support a hinge shaft 2 of the brake pad 12 is designed as a long circular shaft hole 3, and a length direction of the long circular shaft hole 3 is consistent with a direction of a friction force acted on a position of a friction surface of the brake pad 12 during braking, and this position has the same height as a shaft center of the hinge shaft 2 of the brake pad 12. Due to this arrangement, the hinge shaft 2 of the brake pad 12 can move upwards or downwards in the long circular shaft hole 3 of the brake arm 1 along the length direction of the long circular shaft hole 3 the under the action of braking friction force, thereby generating a braking displacement, the movement direction of the hinge shaft 2 of the brake pad 12 is related to the rotation direction of the brake element (i.e., the brake pad 12), and the magnitude of the braking displacement is proportional to the product of the positive pressure acted on the brake pad 12 and the friction coefficient between the brake pad 12 and the brake disc when braking action is performed by the arm disc brake.

Figure 3:
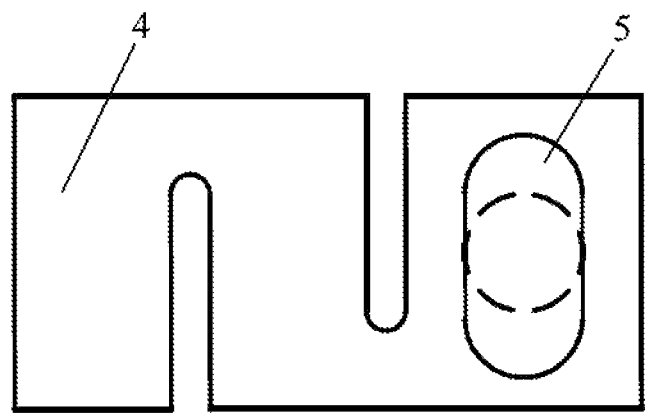
FIG. 3 and FIG. 4 illustrate schematic structural diagrams of two connecting plates used in embodiment one.
Figure 4:
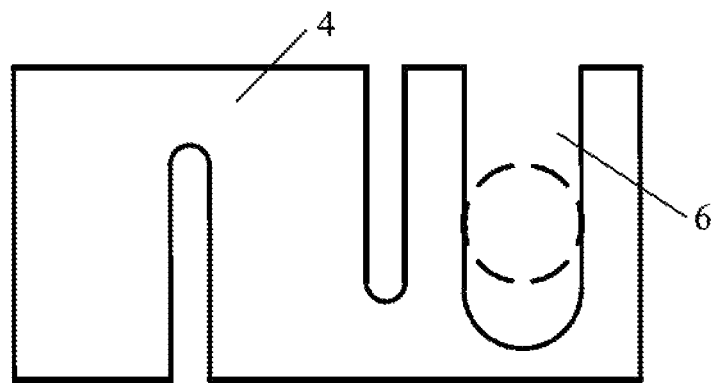

The connecting plate 4 is a plate-shaped component configured to detect the braking displacement of the hinge shaft 2 of the brake pad 12. As shown in FIG. 3 and FIG. 4, a specific structure of the connecting plate 4 is described below: a plate surface of a rectangular plate is provided with two slits parallel to short edges of a plate body of the rectangular plate, directions of openings of the two slits are opposite, so that the plate surface of the connecting plate is divided into three relatively independent and sequentially connected portions, and the connecting plate 4 is a S-shaped plate with a rectangular profile. The plate body of the connecting plate 4 is provided with a closed hole 5 (as shown in FIG. 3) or an open groove 6 (as shown in FIG. 4) sleeved with the hinge shaft 2 of the brake pad 12. The closed hole 5 may be a round hole having a diameter slightly greater than the diameter of the hinge shaft of the brake pad 12, or may be a long round hole having a radius slightly greater than the radius of the hinge shaft 2 of the brake pad 12. A length direction of the long round hole is perpendicular to a length direction of the long circular shaft hole 3 of the brake arm 1 after the connecting plate 4 is mounted on the brake arm 1 (as shown in FIG. 2).

Figure 2:
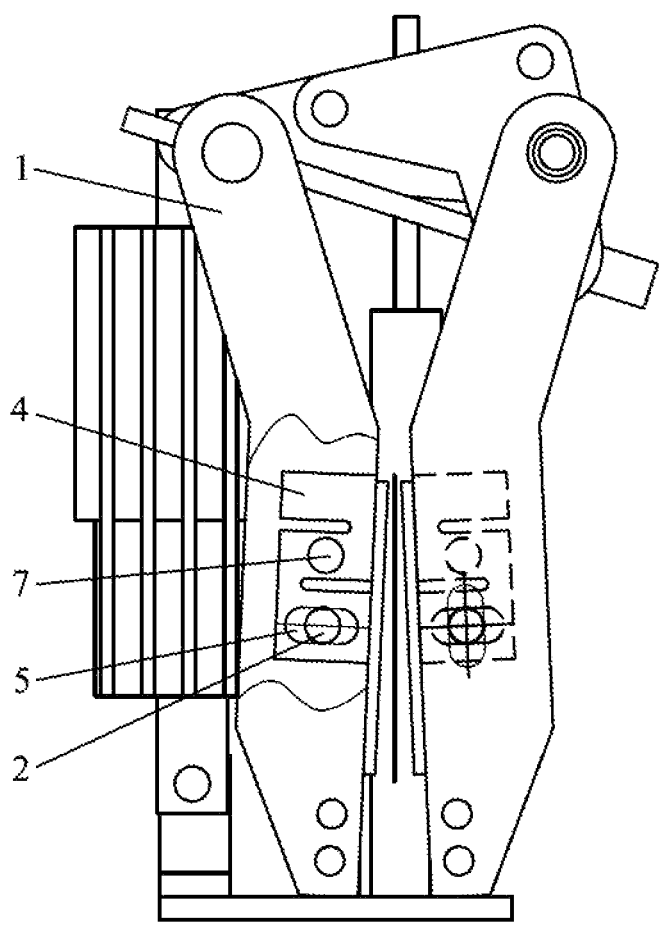
FIG. 2 illustrates a schematic structural diagram of a braking torque sensor according to embodiment one of the present disclosure.

The closed hole 5 or the open groove 6 are provided on one end of the plate body of the connecting plate, when an upper end of the connecting plate 4 is secured with the brake arm 1 of the brake, the closed hole 5 or the open groove 6 located at a lower end of the plate body is sleeved on the hinge shaft 2 of the brake pad 12, and the center line along the length direction of the plate body is kept coincident or substantially coincident with the center line along the length direction of the long circular shaft hole 3 on the brake arm 1 (as shown in FIG. 2).

In FIG. 2, a connecting plate 4 with S-shaped plate body is respectively arranged on two inner side surfaces of two groups (i.e., four) of brake arms 1 of the arm disc brake, the two connecting plates 4 are symmetrically arranged, an upper end of each connecting plate 4 is secured with the inner side surface of the brake arm 1, and the lower end of the connecting plate 4 is sleeved on the hinge shaft 2 of the brake pad 12 through the closed hole 5, such that the shaft center of the hinge shaft 2 of the brake pad 12 is located at the center of the length direction of the long circular shaft hole 3 of the brake arm 1 when it is in a static state, and a suspension connection is formed between the brake pad 12 and the brake arm 1 through the connecting plate 4. When a braking action is performed by the brake by the brake, the hinge shaft 2 of the brake pad 12 will generate a braking displacement with the brake pad 12, and the connecting plate 4 connected with the brake pad 12 can detect the braking displacement, and generate a corresponding plate deformation.

In FIG. 2, the tension sensor 7 is fixed in the middle position of the plate surface of the connecting plate, and this position is the optimal position where the connecting plate can generate the plate deformation. The tension sensor 7 converts the plate deformation generated by the braking action on the connecting plate into pressure information, and transmits the pressure information to the outside in a form of an electrical signal or a digital signal. The pressure information can be regarded as the friction force generated when the braking action is performed by the brake, and the braking torque of the brake can be obtained by multiplying the friction force with the radius of the brake pad 12.

Embodiment Two

Figure 5:
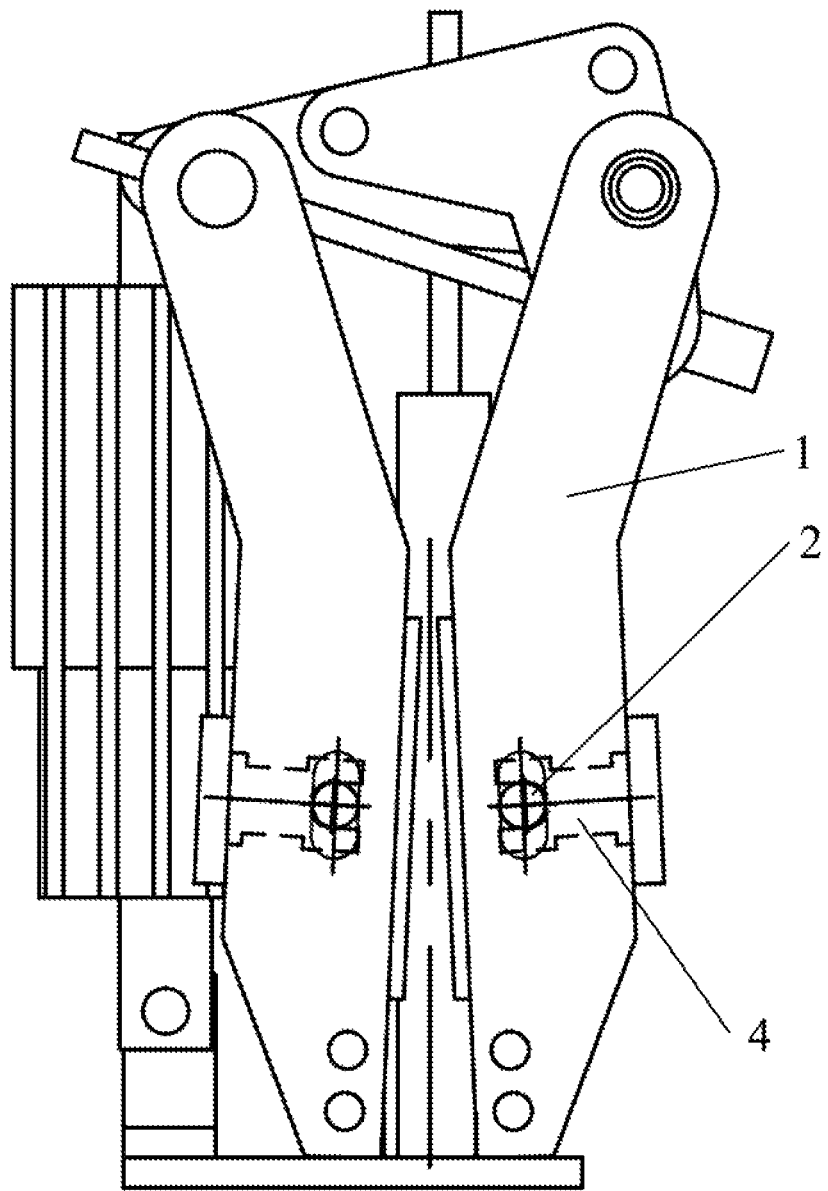
FIG. 5 illustrates a schematic structural diagram of a braking torque sensor according to embodiment two of the present disclosure.

As shown in FIG. 5, this embodiment is also suitable for a braking torque sensor on the arm disc brake, and the basic structure of this braking torque sensor is substantially the same as the braking torque sensor disclosed in embodiment one, except that the specific structures and the positions of the connecting plates of the two braking torque sensors are different.

Figure 6:
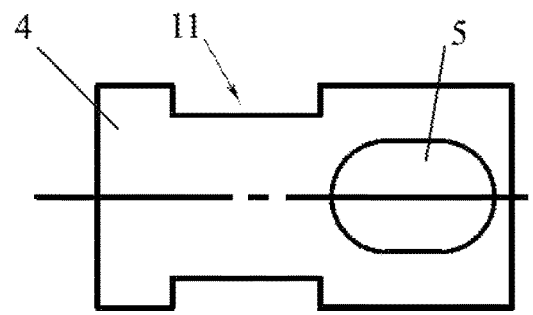
FIG. 6 and FIG. 7 illustrate schematic structural diagrams of two connecting plates used in embodiment two.
Figure 7:
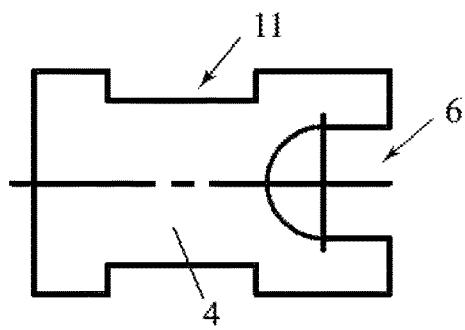

As shown in FIG. 6 and FIG. 7, in this embodiment, the connecting plate 4 is a rectangular plate, a fixed end fixed to the brake arm 1 is a short edge end, the two long edges adjacent to the fixed end of the connecting plate 4 are provided with two rectangular grooves 11, the two rectangular grooves 11 are the same in size and are symmetrically distributed on the connecting plate 4, so that the plate body between the two rectangular grooves has a neck-shaped feature, and becomes an optimal position where the plate deformation due to braking displacement can be detected. Tension sensors (not shown) are disposed on bottom surfaces of the two rectangular grooves 11 of the connecting plate 4, respectively.

Both the closed hole 5 (as shown in FIG. 6) and the open groove 6 (as shown in FIG. 7) can be provided on the connecting plate 4. The closed hole 5 or the opening groove 6 is provided on one end of the connecting plate opposite to the fixed end, and an opening of the opening groove 6 is located on the short edge of the connecting plate 4. The closed hole 5 may be a round hole having a diameter slightly greater than the diameter of the hinge shaft 2 of the brake pad 12, or may be a long round hole having a radius slightly greater than the radius of the hinge shaft 2 of the brake pad 12, and the length direction of the long round hole is perpendicular to the length direction of the long circular shaft hole 3 of the brake arm 1 after the connecting plate 4 is mounted on the brake arm 1. The open groove 6 is a long circular hole with a semicircular groove surface, and the length direction of the open groove is perpendicular to the length direction of the long circular shaft hole 3 on the brake arm 1 after the connecting plate 4 is mounted on the brake arm 1 (as shown in FIG. 5).

In FIG. 5, after the connecting plate 4 is mounted on the brake arm 1 of the brake, the center line along the length direction of the connecting plate 4 is perpendicular to the center line along the length direction of the long circular shaft hole 3. Due to this arrangement, the two connecting plates 4 are respectively mounted on the inner side surfaces of the two groups of brake arms 1 of the arm disc brake, the two connecting plates 4 arranged on each group of brake arms 1 are symmetrically arranged, one end of the connecting plate 4 is fixed on a side edge of the brake arm 1, and the other end of the connecting plate 4 is sleeved on the hinge shaft 2 of the brake pad 12 through the open groove 6 (or the closed hole 5), such that a shaft center of the hinge shaft 2 of the brake pad 12 is located at a center position along the length direction of the long circular shaft hole 3 of the brake arm 1 when it is in a static state, and a suspension connection is formed between the brake pad 12 and the brake arm 1 through the connecting plate 4. Since the hinge shaft 2 of the brake pad 12 is transversely lifted by the connecting plate 4, such that a shaft end of the hinge shaft 2 of the brake pad 12 is located at the middle of the long circular shaft hole 3 of the brake arm 1. When braking action is performed by the brake, the hinge shaft 2 of the brake pad 12 generates a vertical braking displacement with the brake pad 12.

Therefore, a braking displacement can be sensed on the connecting plate 4, and a plate deformation corresponding to the braking displacement is generated on the bottom surface of the rectangular groove of the connecting plate 4, the tension sensor 7 arranged on the bottom surface of the rectangular groove 11 can convert the plate deformation into pressure information, and transmit the pressure information outwards in the form of an electrical signal or a digital signal.

Embodiment Three this embodiment is applicable to a braking torque sensor of an external contacting brake. The braking torque sensor includes a long circular shaft hole formed on the brake arm, a connecting plate connecting the brake arm and a brake shoe 8, and a tension sensor arranged on the connecting plate, etc.

Figure 8:
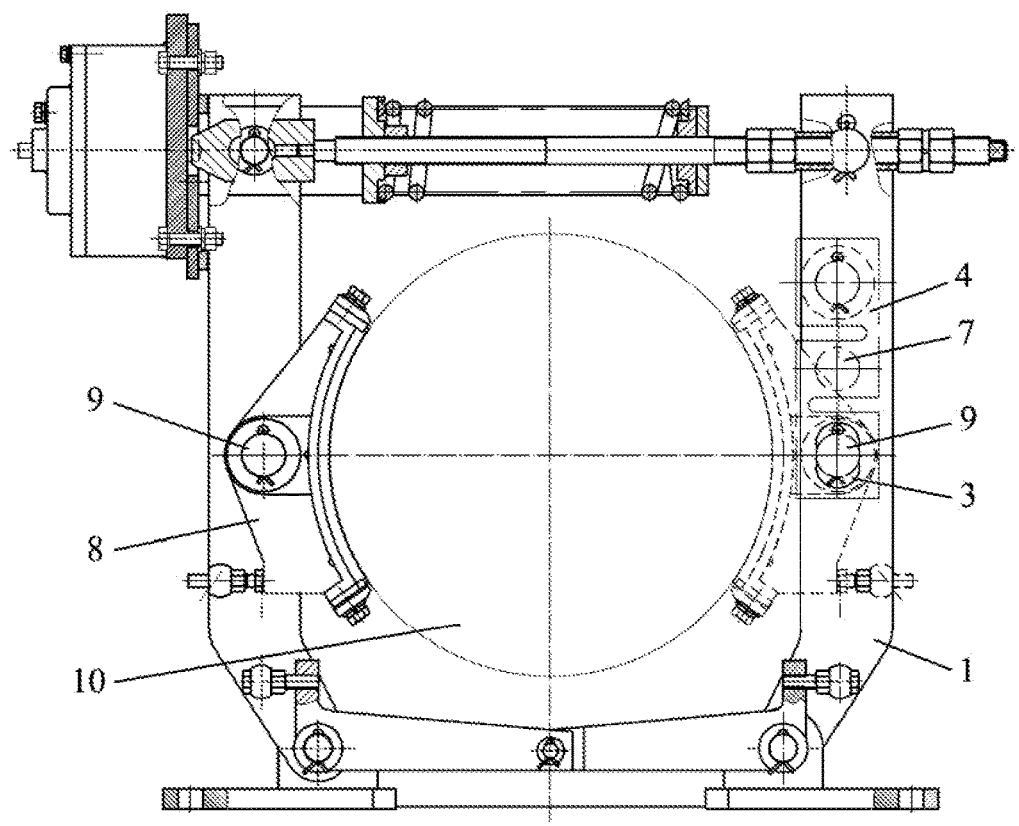
FIG. 8 illustrates a schematic structural diagram of a braking torque sensor according to embodiment three of the present disclosure.

On the external contacting brake shown in FIG. 8, two brake elements (i.e., brake shoes 8) are respectively mounted on the two brake arms 1, the shaft holes configured to support the hinge shaft 9 of the brake shoe 8 on the two brake arms 1 are designed as long circular shaft holes 3, and a length direction of each long circular shaft hole 3 is consistent with a direction of a friction force acted on a position of a friction surface of a brake shoe 8 during braking, and this position has the same height as a shaft center of the hinge shaft 9 of the brake shoe 8. Due to this arrangement, under the action of the braking friction force, the hinge shaft 9 of the brake shoe 8 can move upwards or downwards in the long circular shaft hole 3 of the brake arm 1 in the length direction of the long circular shaft hole 3 to generate a braking displacement, and the specific movement direction of the hinge shaft 9 of the brake shoe 8 is related to the rotation direction of the brake element (i.e., brake drum)10, and the magnitude of the braking displacement is proportional to the product of the positive pressure acted on the brake drum by the external contacting brake and the friction coefficient between the brake shoe 8 and the brake drum during braking process.

The structure of the connecting plate 4 in this embodiment is the same as the structure of the connecting plate 4 in embodiment one, so that the detail of the connecting plate 4 in this embodiment is not repeatedly described here.

In FIG. 8, two S-shaped connecting plate 4 are mounted on two outer sides of the two brake arms 1 of the external contacting brake, the two connecting plates 4 mounted on each brake arm 1 are symmetrically arranged, and the two connecting plates 4 on the same side of the two brake arms 1 are also symmetrically arranged. An upper end of each connecting plate 4 is arranged on an outer side wall of the brake arm 1 through bolt connection or convex shaft hinge connection, and a lower end of the connecting plate 4 is sleeved on the hinge shaft 9 of the brake shoe 8 through a circular closed hole with a diameter slightly greater than the diameter of the hinge shaft 9 of the brake shoe 8, so that the shaft center of the hinge shaft 9 of the brake shoe 8 is located at a central position of the length direction of the long circular shaft hole 3 of the brake arm 1 when it is in a static state, and a suspension connection is formed between the brake shoe 8 and the brake arm 1 through the connecting plate 4. Since the brake shoe 8 is connected with the brake arm 1 through the connecting plate 4, and the shaft end of the hinge shaft 9 of the brake shoe 8 is located at the middle of the long circular shaft hole 3 of the brake arm 1, so that the connecting plate 4 can detect the braking displacement of the hinge shaft 9 of the brake shoe 8, and generate a plate deformation corresponding to the braking displacement when the braking action is performed by the brake.

In FIG. 8, the tension sensor 7 is fixed at the middle position of the plate surface of the connecting plate 4, and this position is the optimal position where the connecting plate 4 can generate the plate deformation. The tension sensor 7 converts the plate deformation generated by the braking action on the connecting plate into pressure information, and transmits the pressure information to the outside in the form of electrical signal or digital signal.

Embodiment Four

Figure 9:
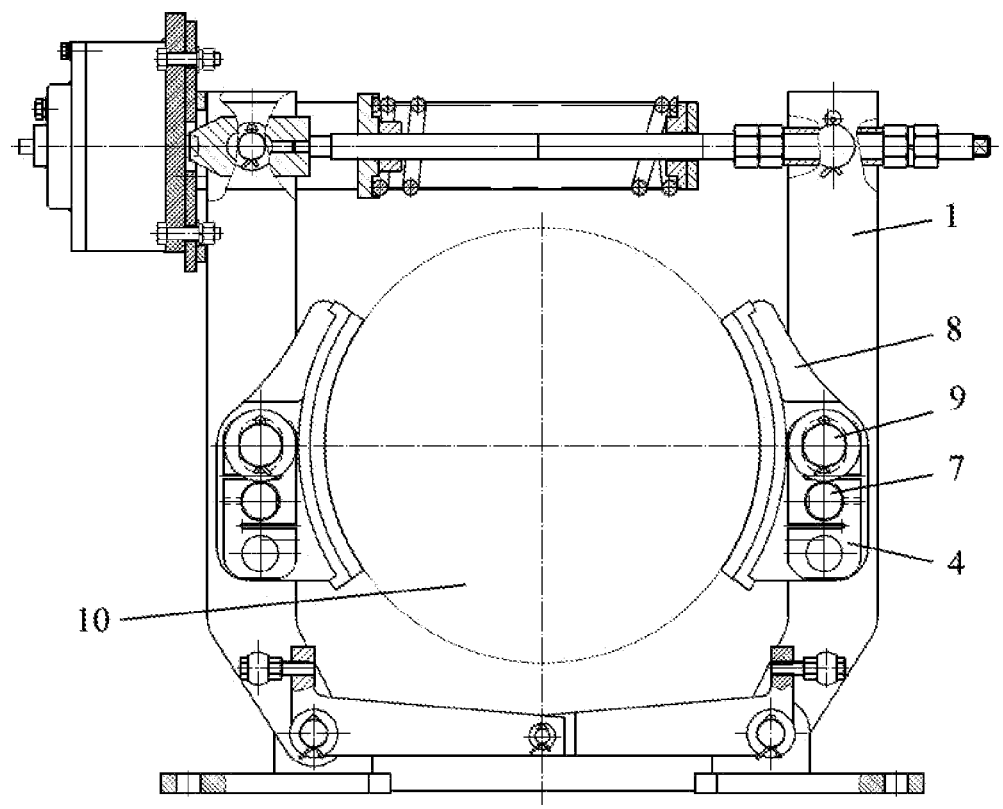
FIG. 9 illustrates a schematic structural diagram of a braking torque sensor according to embodiment four of the present disclosure.

As shown in FIG. 9, this embodiment is also applicable to a braking torque sensor on the external contacting brake, and a suspension connection is also formed between the brake arm 1 and the brake shoe 8 through the long circular shaft hole 3 and the connecting plate 4, except that the long circular shaft hole 3 is provided on the brake arm 1 in the embodiment three, the long circular shaft hole 3 is provided on the brake shoe 8 in this embodiment; of course, the connection manner of the connecting plate 4 in this embodiment is also changed accordingly.

As shown in FIG. 9, the braking torque sensor in the present disclosure includes a long circular shaft hole 3 provided on a brake shoe 8 of a brake, a connecting plate 4 connecting the brake arm 1 with the brake shoe 8, and a tension sensor 7 provided on the connecting plate 4, etc.

Figure 10:
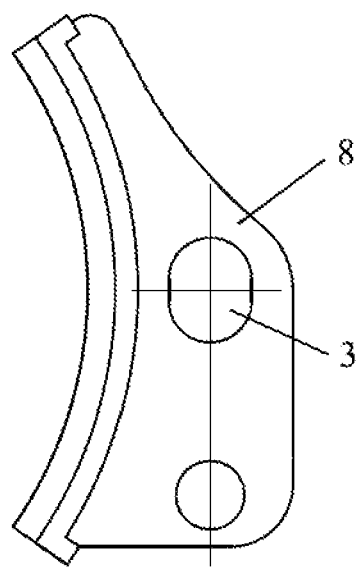
FIG. 10 illustrates a schematic structural diagram of a brake shoe in embodiment four.

According to the external contacting brake shown in FIG. 9, the shaft hole provided on the brake arm 1 and configured to penetrate through a hinge shaft 9 of the brake shoe 8 is still a round hole, and the shaft hole provided on the brake shoe 8 and configured to penetrate through the hinge shaft 9 of the brake shoe 8 is designed as a long circular shaft hole 3 (as shown in FIG. 10), the length direction of the long circular shaft hole 3 is consistent with a direction of a friction force acted on a position of a friction surface of the brake shoe 8 during braking, and this position of the friction surface of the brake shoe 8 has a same height as a shaft center of the hinge shaft 9 of the brake shoe 8, so that the brake shoe 8 is enabled to generate a displacement that varies with a magnitude of the friction force in the direction of the friction force when the external contacting brake performs the braking action.

The structure of the connecting plate 4 is the same as the structure of the connecting plate 4 in embodiment three, except that the mounting direction of the connecting plate 4 in this embodiment is opposite to the mounting direction of the connecting plate 4 in embodiment three, that is, the upper end of the connecting plate 4 is sleeved on the hinge shaft 9 of the brake shoe 8 through a circular shaft hole, and the lower end of the connecting plate 4 is hinged on a side wall of the brake shoe 8 through matching of round hole and convex shaft, so that the shaft center of the hinge shaft 9 of the brake shoe 8 is located at the center position of the length direction of the long circular shaft hole 3 of the brake shoe 8 when it is in a static state, and a suspension connection is formed between the brake shoe 8 and the brake arm 1. Due to this arrangement, when the braking action is performed by the brake, the connecting plate 4 can detect the braking displacement of the brake shoe 8 and generate a plate deformation corresponding to the braking displacement.

In FIG. 9, the tension sensor 7 is fixed at the middle of the plate surface of the connecting plate 4, and the middle of the plate surface of the connecting plate 4 is the optimal position where the connecting plate 4 can generate the plate deformation. The tension sensor 7 converts the plate deformation generated by the braking action on the connecting plate 4 into pressure information, and transmits the pressure information to the outside in the form of electrical signal or digital signal.

Embodiment Five

Figure 11:
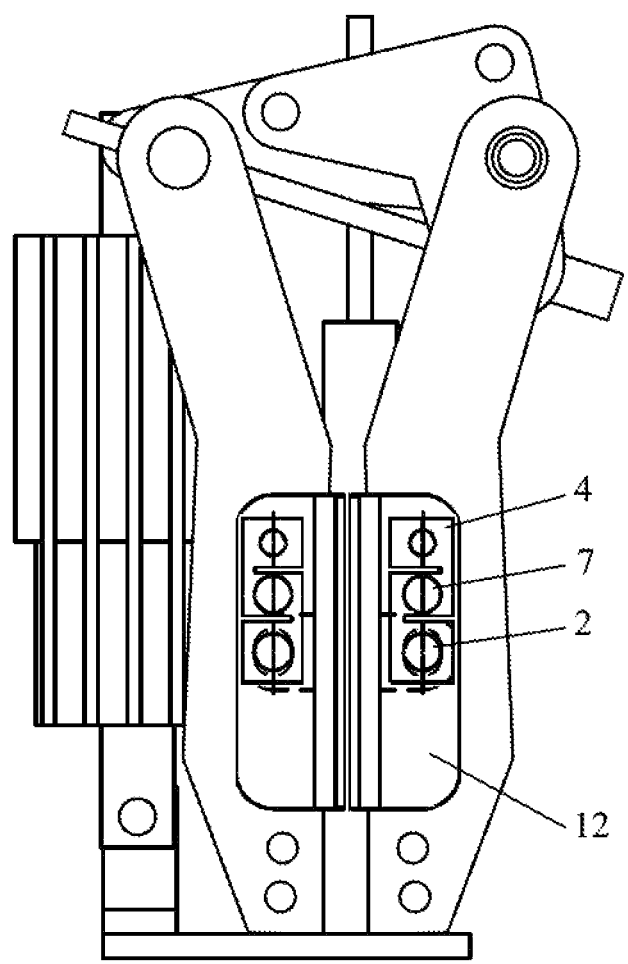
FIG. 11 is a top view of a braking torque sensor according to embodiment five of the present disclosure.

As shown in FIG. 11, this embodiment is applicable to a braking torque sensor of an arm disc brake, in this embodiment, the suspension connection is formed between the brake arm 1 and the brake pad 12 through the long circular shaft hole 3 and the connecting plate 4, too, except that the long circular shaft hole 3 is provided on the brake arm 1 in the embodiment one, the long circular shaft hole 3 is provided on the brake pad 12 in this embodiment; of course, the arrangement and connection manner of the connecting plate 4 in this embodiment is also changed accordingly.

As shown in FIG. 11, the braking torque sensor of the present disclosure includes a long circular shaft hole 3 provided on the brake pad 12, a connecting plate 4 connecting the brake arm 1 with the brake pad 12, a tension sensor 7 provided on the connecting plate 4, etc.

Figure 12:
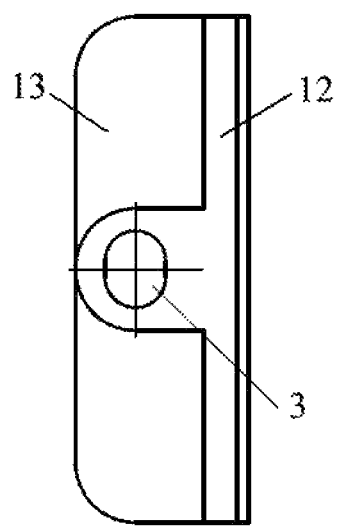
FIG. 12 illustrates a schematic structural diagram of one side of the brake shoe in the embodiment five.

According to the arm disc brake shown in FIG. 11, the shaft hole arranged on the brake arm 1 and configured to penetrate through the hinge shaft 2 of the brake pad 12 is still a round hole, and the shaft hole provided on the brake pad 12 and configured to penetrate through the hinge shaft 2 of the brake pad 12 is designed as a long circular shaft hole 3 (as shown in FIG. 12), the length direction of the long circular shaft hole 3 is consistent with the direction of the friction force acted on a position of a friction surface of the brake pad 12 during braking, and this position has the same height as the shaft center of the hinge shaft 2 of the brake pad 12, so that the brake pad 12 can generate a braking displacement that varies with the magnitude of the friction force in the direction of the braking friction when the arm disc brake performs the braking action.

Figure 13:
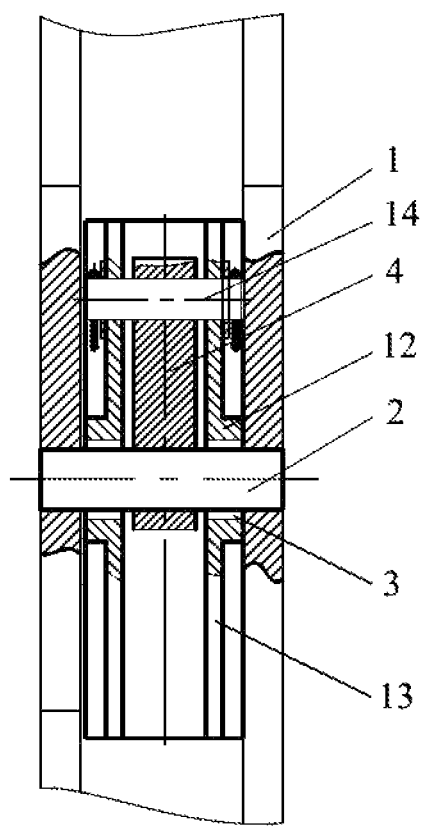
FIG. 13 illustrates a schematic structural diagram of a part of the braking torque sensor in embodiment five.

The structure of the connecting plate 4 in this embodiment is the same as the structure of the connecting plate in embodiment one, except that the thickness of the connecting plate 4 is increased, and the mounting position of the connecting plate 4 is changed. As shown in FIG. 13, a lower end of the connecting plate 4 is sleeved on the hinge shaft 2 of the brake pad 12 that penetrates between two vertical rib plates 13 at the rear of the brake pad 12 through a circular shaft hole, the upper end of the connecting plate 4 is provided with a through hole which is sleeved on a pin shaft 14, the pin shaft 4 penetrates through the two rib plates 13 at the rear of the brake pad 12, such that the connecting plate 4 can be longitudinally arranged in a groove formed between the two rib plates 13 at the rear of the brake pad 12, and the suspension connection can be formed between the brake pad 12 and the brake arm 1. Due to this arrangement, when the braking action is performed by the brake, the connecting plate 4 can detect the amount of braking displacement generated by the brake pad 12 in the direction of the friction force, and generate a plate deformation corresponding to the braking displacement.

In FIG. 11, after the connecting plate 4 is mounted on the brake pad 12 of the arm disc brake, the center line along the length direction of the connecting plate 4 coincides with the center line along the length direction of the long circular shaft hole 3 on the brake pad 12 (as shown in FIG. 11).

In FIG. 11, the tension sensor 7 is fixed at the middle of the plate surface of the connecting plate 4, the middle of the plate surface of the connecting plate 4 is the optimal position where the connecting plate 4 can generate the plate deformation. The tension sensor 7 converts the plate deformation generated by the braking action on the connecting plate 4 into pressure information, and transmits the pressure information to the outside in the form of electrical signal or digital signal.

What is claimed is:

1. A braking torque sensor of a brake, comprising:
   a long circular shaft hole arranged on a brake arm of the brake and configured to support a hinge shaft of a brake element, wherein when a braking action is performed by the brake, a length direction of the long circular shaft hole is consistent with a direction of a friction force acted on a position of a friction surface of the brake element, and the position of the friction surface of the brake element is located at a same height of a shaft center of the hinge shaft of the brake element, so that the hinge shaft of the brake element generates a displacement that varies with a magnitude of the friction force in a direction of the friction force when the braking action is performed by the brake;
   a plate-shaped connecting plate, wherein one end of the connecting plate is fixed on the brake arm of the brake, and the other end of the connecting plate is sleeved on a hinge shaft of the brake element through a closed hole or an open groove, so that the shaft center of the hinge shaft of the brake element is located at a center position along a length direction of the long circular shaft hole of the brake arm when it is in a static state; the connecting plate is configured to detect a braking displacement generated by the hinge shaft of the brake element in the long circular shaft hole when the braking action is performed by the brake, and generate a plate deformation corresponding to the braking displacement; and
   a tension sensor, fixed on an optimal position of a plate surface of the connecting plate where the plate deformation is generated, and configured to convert the plate deformation generated due to the braking action on the connecting plate into force information, and transmit the force information outwards in a form of an electrical signal or a digital signal.

2. The braking torque sensor of the brake according to claim 1, wherein the connecting plate is a rectangular plate, a fixed end of the connecting plate fixed on the brake arm is a short edge end, two rectangular grooves are provided on two long edges of a plate body of the connecting plate adjacent to the fixed end respectively, and the two rectangular grooves have a same size and are symmetrically distributed on the connecting plate; the tension sensor is arranged on a bottom groove surface of the rectangular grooves, and the center line along the length direction of the connecting plate is perpendicular to the center line along the length direction of the long circular shaft hole after the connecting plate is mounted on the brake arm of the brake.

3. The braking torque sensor according to claim 1, wherein the connecting plate is a S-shaped plate with a rectangular profile, the tension sensor is arranged at a middle of the plate surface of the connecting plate, and a center line along a length direction of the connecting plate coincides with a center line along a length direction of the long circular shaft hole after the connecting plate is mounted on the brake arm of the brake.

4. The braking torque sensor according to claim 3, wherein the closed hole is a round hole having a diameter slightly greater than a diameter of the hinge shaft of the brake element, or a long round hole having a radius slightly greater than a radius of the hinge shaft of the brake element; and wherein a length direction of the long circular hole is perpendicular to the length direction of the long circular shaft hole of the brake arm after the connecting plate is mounted on the brake arm.

5. The braking torque sensor according to claim 3, wherein the open groove is a long circular hole with a semicircular groove surface, and a length direction of the open groove is perpendicular to the length direction of the long circular shaft hole of the brake arm after the connecting plate is mounted on the brake arm.

6. A braking torque sensor, comprising:
   a long circular shaft hole arranged on a brake shoe of an external contacting brake and configured to penetrate through a hinge shaft of the brake shoe, wherein when a braking action is performed by the brake, a length direction of the long circular shaft hole is consistent with a direction of a friction force acted on a position of a friction surface of the brake shoe, and the position of the friction surface of the brake shoe is located at a same height of a shaft center of the hinge shaft of the brake shoe, so that the brake shoe can generates a displacement that varies with a magnitude of the braking friction force in the direction of the friction force when the external contacting brake performs the braking action;
   a plate-shaped connecting plate, wherein an upper end of the connecting plate is sleeved on the hinge shaft of the brake shoe through the long circular shaft hole, a lower end of the connecting plate is hinged on a side wall of the brake shoe through matching of the long circular shaft hole and the hinge shaft of the brake shoe, so that the shaft center of the hinge shaft of the brake shoe is located at a center position along a length direction of the long circular shaft hole of the brake shoe when it is in a static state; the connecting plate is configured to detect a braking displacement generated by the brake shoe in the direction of the friction force when the external contacting brake performs the braking action, and generate a plate deformation corresponding to the braking displacement; and
   a tension sensor, fixed on an optimal position of a plate surface of the connecting plate where the plate deformation is generated, and configured to convert the plate deformation generated due to the braking action on the connecting plate into force information, and transmit the force information outwards in a form of an electrical signal or a digital signal.

7. The braking torque sensor according to claim 6, wherein the connecting plate is a S-shaped plate having a rectangular profile, the tension sensor is arranged at a middle of the plate surface of the connecting plate, and the length direction of the connecting plate coincides with the center line along the length direction of the long circular shaft hole after the connecting plate is mounted on the brake shoe of the external contacting brake.

8. A braking torque sensor of a brake, comprising:
   a long circular shaft hole arranged on a brake pad of an arm disk brake and configured to penetrate through a hinge shaft of the brake pad, wherein when a braking action is performed by the brake, a length direction of the long circular shaft hole is consistent with a direction of a friction force acted on a position of a friction surface of the brake pad, and the position of the friction surface of the brake pad is located at a same height of a shaft center of the hinge shaft of the brake pad, so that the brake pad generates a displacement that varies with a magnitude of the friction force in the direction of the friction force when the arm disk brake performs the braking action;

a plate-shaped connecting plate, wherein a lower end of the connecting plate is sleeved on the hinge shaft of the brake pad through the long circular shaft hole, and the hinge shaft of the brake pad penetrates between two rib plates at the rear of the brake pad, an upper end of the connecting plate is provided with a through hole which is sleeved on a pin shaft between the two rib plates at the rear of the brake pad, so that the connecting plate is arranged longitudinally in a groove formed between the two rib plates at the rear of the brake pad; the connecting plate is configured to detect a braking displacement generated by the brake pad in the direction of the friction force when the arm disk brake performs the braking action, and generate a plate deformation corresponding to the braking displacement; and a tension sensor, fixed on an optimal position of a plate surface of the connecting plate where the plate deformation is generated, and configured to convert the plate deformation generated due to the braking action on the connecting plate into force information, and transmit the force information outwards in a form of an electrical signal or a digital signal.

9. The braking torque sensor according to claim 8, wherein the connecting plate is a S-shaped plate having a rectangular profile; the tension sensor is arranged at the middle of the plate surface of the connecting plate, and the center line along the length direction of the connecting plate coincides with the center line along the length direction of the long circular shaft hole after the connecting plate is mounted on the brake shoe of the arm disc brake.

\* \* \* \* \*